(12) United States Patent
Hu

(10) Patent No.: US 10,345,466 B2
(45) Date of Patent: Jul. 9, 2019

(54) MEMORY EFFICIENT Q-RTM COMPUTER METHOD AND APPARATUS FOR IMAGING SEISMIC DATA

(71) Applicant: ADVANCED GEOPHYSICAL TECHNOLOGY INC., Houston, TX (US)

(72) Inventor: Wenyi Hu, Katy, TX (US)

(73) Assignee: Advanced Geophysical Technology Inc., Houston, TX (US)

( * ) Notice: Subject to any disclaimer, the term of this patent is extended or adjusted under 35 U.S.C. 154(b) by 175 days.

(21) Appl. No.: 15/658,847

(22) Filed: Jul. 25, 2017

(65) Prior Publication Data

US 2019/0033479 A1    Jan. 31, 2019

(51) Int. Cl.
*G01V 1/34* (2006.01)
*G01V 1/28* (2006.01)
*G01V 1/32* (2006.01)

(52) U.S. Cl.
CPC .............. *G01V 1/345* (2013.01); *G01V 1/282* (2013.01); *G01V 1/32* (2013.01); *G01V 2210/74* (2013.01)

(58) Field of Classification Search
CPC .......... G01V 1/345; G01V 1/282; G01V 1/32; G01V 2210/74
See application file for complete search history.

(56) References Cited

U.S. PATENT DOCUMENTS

2011/0288831 A1* 11/2011 Tan ................. G01V 1/282
                                                      703/2
2013/0107665 A1*  5/2013 Fletcher ........... G01V 1/36
                                                      367/43

* cited by examiner

*Primary Examiner* — Regis J Betsch
*Assistant Examiner* — Jeremy A Delozier
(74) *Attorney, Agent, or Firm* — Finnegan, Henderson, Farabow, Garrett & Dunner

(57) ABSTRACT

A memory-efficient Q-RTM computer method and apparatus for imaging seismic data is described. A seismic image may be formed from a memory-efficient Q-RTM module utilizing received attenuated seismic data. Seismic data is processed by the memory-efficient Q-RTM module to compensate for amplitude attenuation and phase velocity dispersion simultaneously during back-propagation in RTM. A negative quality factor, Q, is obtained by modifying the wave equation to compensate for amplitude attenuation. One or more dispersion optimization terms introduced to a wave equation for compensation of Q effects on the phase, solved by a finite difference algorithm, compensate for phase velocity change and further adjust amplitude attenuation compensation.

16 Claims, 9 Drawing Sheets

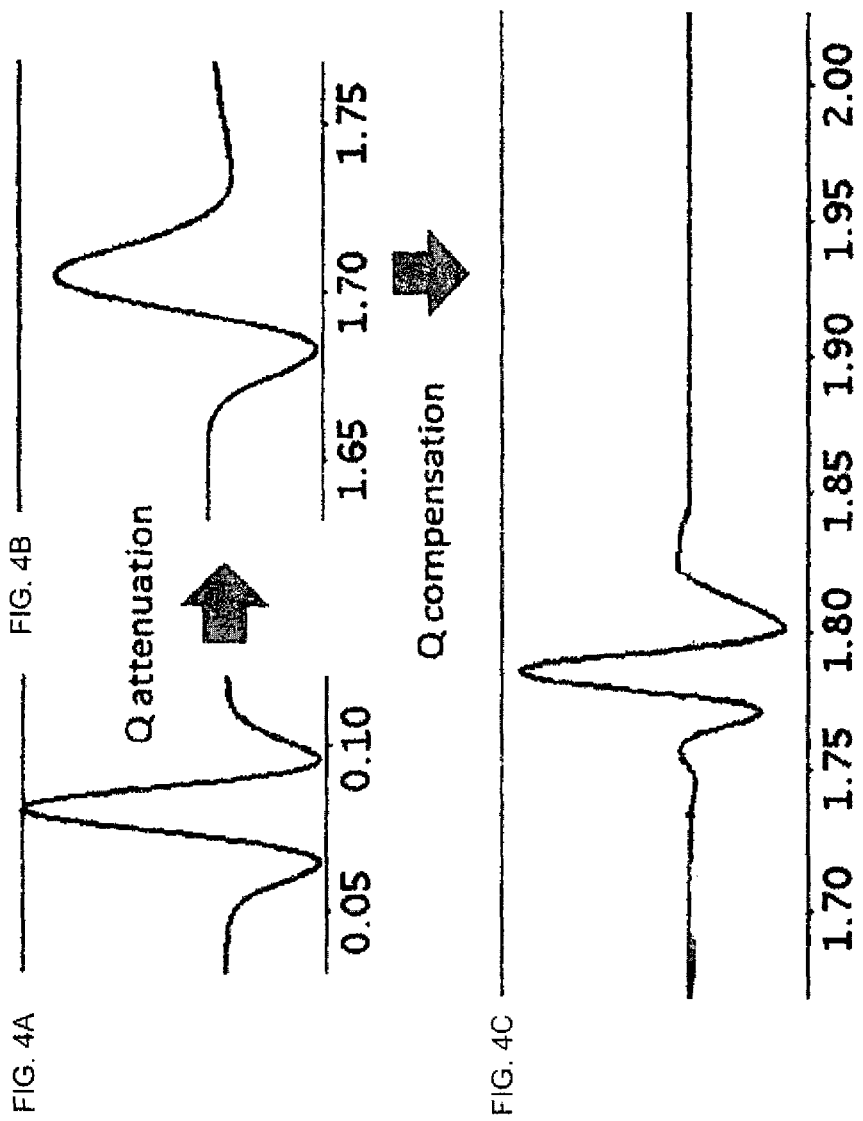

MEMORY EFFICIENT Q-RTM COMPUTER METHOD AND APPARATUS FOR IMAGING SEISMIC DATA

TECHNICAL FIELD/FIELD OF THE DISCLOSURE

The present disclosure relates generally to improvements in computer technology and computerized methods for imaging seismic data.

BACKGROUND OF THE DISCLOSURE

To determine the composition and structure of an underground formation, seismic data may be used. When a seismic wave propagates through the earth from a source, the seismic wave may propagate until the seismic wave is reflected, such as from an interface. The reflected wave is received by a receiver, the reflected wave may provide information regarding the geophysical properties of the subsurface volume of the underground formation. The properties may include, without limitation, seismic wave velocity, mass density, and anisotropy properties. The time between transmission of the seismic wave and reception of the reflected seismic waves may be measured to determine the distance to an interface. In exploration geophysics, by recording the seismic waves at the surface by one or more geophones or hydrophones, a model of the subsurface strata may be created through various seismic processing techniques.

Computer methods for imaging seismic data may be utilized in oil, gas, and coal exploration to generate maps of the subsurface structure of rock formations. The maps and data may be analyzed to assist in locating oil, gas, or coal, and to identify underground formations.

A conventional technique in computer methods for imaging seismic data is reverse time migration ("RTM"). RTM is a two-way depth migration solution that can accurately describe wave propagation in complex media. However, RTM requires large amounts of computation time and memory.

As a seismic wave propagates through a medium, the elastic energy associated with the wave is gradually absorbed by the medium, resulting in dissipation of the wave as heat energy. Thus, seismic data may be adversely affected by absorption of seismic waves by faults and fracturing in the underground formation and by different solids, fluids, gases and voids. This absorption is known as anelastic attenuation. The effect of anelastic attenuation may be amplitude attenuation (reduction in amplitude) and phase velocity change, i.e., velocity dispersion, including, for instance, frequency dependent phase velocity.

One conventional computer method for correcting for amplitude attenuation and velocity dispersion is "Q-RTM." The "Q" in "Q-RTM" is the anelastic quality factor. "Q" quantifies the effects of anelastic attenuation. "Q" is inversely proportional to the attenuation. Q may be defined as:
$Q=2\pi(E/\delta E)$ where $E/\delta E$ is the fraction of energy lost per cycle.

In certain embodiments, Q may be constant or nearly constant over a predetermined seismic frequency range.

By introducing memory variables to approximate constant Q effect, a wave propagation equation that incorporates anelastic attenuation may be represented as:

$$\frac{\partial v}{\partial t} = -\frac{1}{\rho}\nabla p$$

$$\frac{\partial p}{\partial t} = -\lambda(1+L\tau)\nabla \cdot v - \sum_{i=1}^{L} r_i + Q$$

$$\frac{\partial r_i}{\partial t} = -\frac{1}{\tau_{\sigma i}}r_i - \frac{\lambda\tau}{\tau_{\sigma i}}\nabla \cdot v$$

Where t is time, v is the particle velocity, p is the measured pressure of the seismic wave, $\lambda$ is the bulk modulus, $\rho$ is the mass density, r is the memory variable, S is the source term, $\tau$ and $\tau_\sigma$ are parameters selected to approximate a constant Q over a specific frequency range, and L is the number of relaxation mechanisms.

In certain traditional embodiments, a $\tau$ method is designed to simulate anelastic attenuation effects, such as Q attenuation, but cannot be applied to simulate compensation effects, such as Q compensation. From the $\tau$ method, an equation for complex velocity has been derived, allowing calculation of Q from the complex velocity equation. Q at frequency $\omega$ may be calculated as:

$$Q(\omega) = \frac{1 + L\tau - \sum_{l=1}^{L}\frac{\tau}{1+\omega^2\tau_{\sigma l}^2}}{\sum_{l=1}^{L}\frac{\omega\tau\tau_{\sigma l}}{1+\omega^2\tau_{\sigma l}^2}}$$

Here, $\tau$ depends on Q and $\tau_{\sigma l}$ depends on the specific frequency range. Because the $\tau$ method cannot simulate compensation effects, traditional methods using the $\tau$ method are inexact.

Conventional Q-RTM computer methods for imaging seismic data (hereinafter, "Q-RTM computer methods") require a substantial amount of computer memory because such conventional computer methods use a global approach. The global approach employs a global differential operator to compensate the effects of anelastic attenuation in the conventional Q-RTM computer methods. One global differential operator is a pseudo-spectral operator based on a Fast Fourier Transform. Implementing a Fast Fourier Transform requires the use of information from the entire computational domain. In the global approach, as each seismic wave measurement is recursively traced backward in time from the receiver to the subsurface reflection point, at each backward time step, the calculation of the back-propagated seismic wavefield at each subsurface point requires the wavefield information for the entire computational domain.

The dependency on a global differential operator for each calculation and the size of the global differential operator cause pseudo-spectral computer methods for imaging seismic data (hereinafter, "pseudo-spectral computer methods") to be computationally expensive, inefficient, and not suitable for parallelization. Computer systems using one or more computing nodes and/or computer clusters may be used for Q-RTM computer methods. Pseudo-spectral computer methods used as part of the process of imaging seismic data often result in poor performance by the computer system on which the conventional Q-RTM computer methods are processed.

Conventionally, for large-scale seismic imaging, due to CPU or graphic processing unit (GPU) memory limitations, the entire computational domain is decomposed into several computational subdomains. Each CPU or GPU calculates one of the computational subdomains. When the entire computational domain is decomposed, individual CPUs or GPUs share the information for the global differential operator that will be applied. The information and in particular the amount of information communicated between CPUs and GPUs slows computations necessary for the seismic imaging. Pseudo-spectral computer methods either lose capability or lose efficiency because computational domain decomposition is difficult with pseudo-spectral computer methods due to the significantly increased communications between CPUs or GPUs.

More memory-efficient Q-RTM computer methods have not been developed. With conventional computer methods, fractional derivatives in dispersion relation compensation cannot be accurately evaluated by using local numerical differential operators, such as finite difference operators.

SUMMARY

The disclosure provides for an improved method in computer-related technology. The method includes receiving attenuated seismic data, receiving a velocity model, and receiving a Q model. The method also includes processing the attenuated seismic data, the velocity model, and the Q model using a memory-efficient Q-RTM module, the memory-efficient Q-RTM module including a computer-executable program stored on a non-tangible medium and performing RTM using a finite difference algorithm to solve:

$$\frac{\partial^2 p}{\partial t^2} = \frac{\lambda}{\rho}(1 - L\tau)\nabla^2(p + p^c) - \sum_{i=1}^{L} s_i + \frac{\partial Q}{\partial t}$$

$$\frac{\partial s_i}{\partial t} = -\frac{1}{\tau_{\sigma i}} s_i - \frac{\lambda \tau}{\rho \tau_{\sigma i}} \nabla^2 p$$

where t is time, $\tau$ and $\tau_\sigma$ are parameters introduced to approximate a constant Q effect over a specific frequency range, L is the number of relaxation mechanisms (such as, in some embodiments, $1 \leq L \leq 5$), and $p^c$ is a sum of one or more dispersion optimization terms. The method also includes generating a seismic image.

A method for imaging seismic data is disclosed. The method includes creating a seismic wave, reflecting the seismic wave from a subsurface feature to form a reflected seismic wave and receiving the reflected seismic wave with one or more receivers. The method also includes converting the reflected seismic wave to attenuated seismic data and communicating the attenuated seismic data to a seismic data processor, the seismic data processor including a memory efficient Q-RTM module. The method further includes receiving a velocity model, receiving a Q model, and processing the attenuated seismic data, the velocity model, and the Q model using a memory-efficient Q-RTM module, the memory-efficient Q-RTM module comprising a computer-executable program stored on a non-tangible medium. In addition, the method includes performing RTM using a finite difference algorithm to solve:

$$\frac{\partial^2 p}{\partial t^2} = \frac{\lambda}{\rho}(1 - L\tau)\nabla^2(p + p^c) - \sum_{i=1}^{L} s_i + \frac{\partial Q}{\partial t}$$

-continued $$\frac{\partial s_i}{\partial t} = -\frac{1}{\tau_{\sigma i}} s_i - \frac{\lambda \tau}{\rho \tau_{\sigma i}} \nabla^2 p$$

where t is time, $\tau$ and $\tau_\sigma$ are parameters introduced to approximate a constant Q effect over a specific frequency range, L is the number of relaxation mechanisms (such as, in some embodiments, $1 \leq L \leq 5$), and $p^c$ is a sum of one or more dispersion optimization terms. In addition, the method includes generating a seismic image.

BRIEF DESCRIPTION OF THE DRAWINGS

The present disclosure is best understood from the following description read with the accompanying figures. Various features are not drawn to scale. Dimensions of features may be arbitrarily increased or reduced for clarity of discussion.

FIG. 4A is a graph of a Ricker source wavelet.

FIG. 4B is a graph of data recorded at a receiver location from the simulated Ricker source wavelet of FIG. 4A propagating through a medium with finite Q values.

FIG. 4C is a graph of two signals wherein the first signal is back propagated data with Q compensation but without dispersion optimization terms and the second signal is back propagated data with Q compensation with dispersion optimization terms.

FIG. 5A (bottom) depicts a dispersion relation curve of a negative-$\tau$ method implementing Q compensation, and (top) negative-Q values of the negative-$\tau$ method without the multi-stage dispersion relation optimization scheme for Q-RTM consistent with embodiments of the present disclosure. FIGS. 5B-5D depict the dispersion relation curves and the corresponding negative-Q values of a negative-$\tau$ method with the multi-stage dispersion relation optimization scheme for Q-RTM consistent with embodiments of the present disclosure.

DETAILED DESCRIPTION

Figure 1:
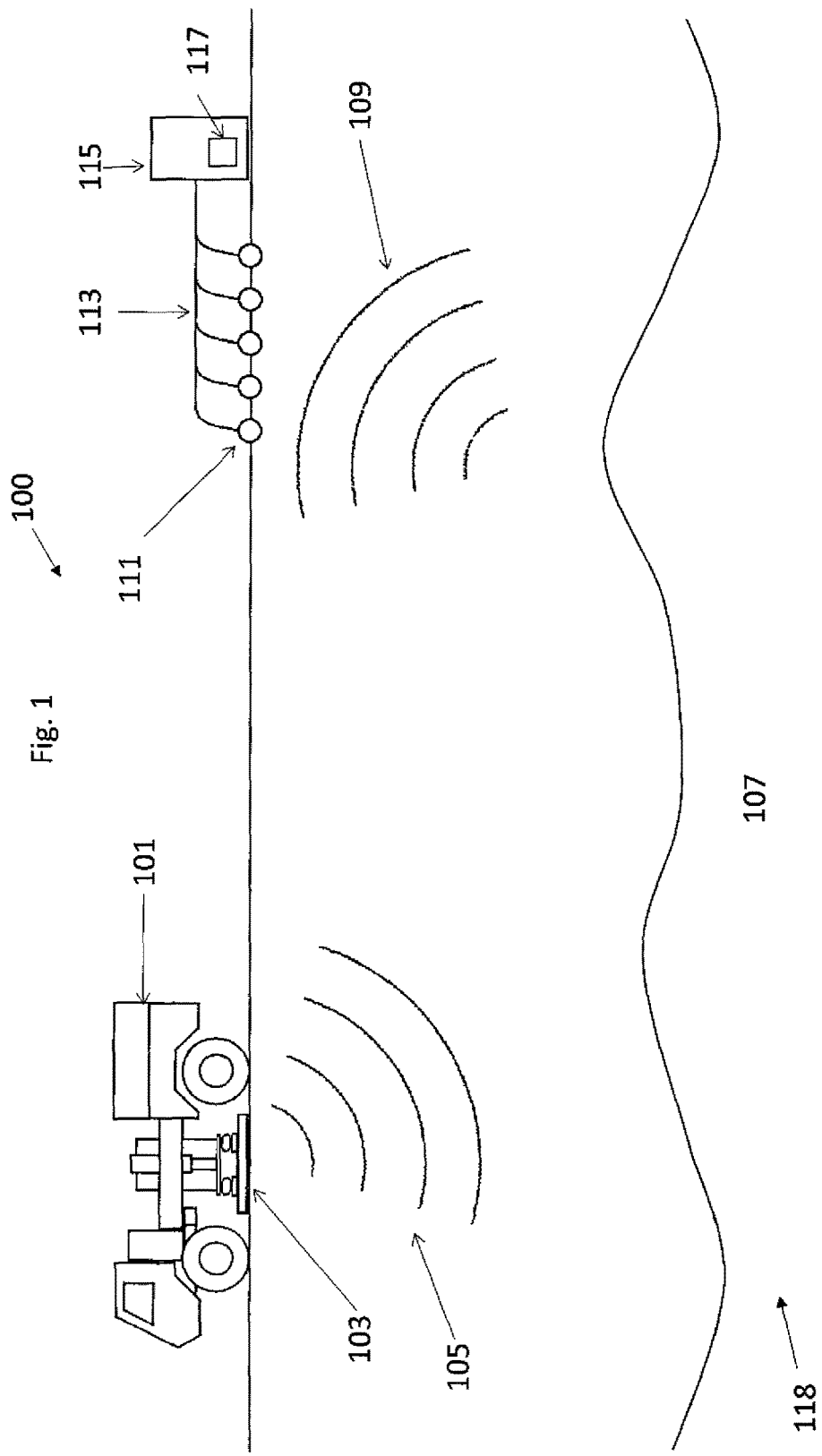
FIG. 1 illustrates a seismic surveying system consistent with certain embodiments of the present disclosure.

The following disclosure provides many different examples for implementing different features of various embodiments. Specific examples of components and arrangements are described to simplify the disclosure. These examples are not limiting. The disclosure may repeat reference numerals or letters in the examples. This repetition is for simplicity and clarity and does not dictate a relationship between the embodiments or configurations. As used herein, plural terms include the singular and vice versa.

In some embodiments of the present disclosure, a seismic survey may be carried out using a seismic energy source to generate seismic waves. The seismic waves may have more than one frequency. The seismic waves may include acoustic waves or shear waves. A seismic energy source, such as a seismic vibration truck, a seismic explosive source, or seismic vessel equipped with water guns, may generate seismic waves that propagate through one or more subsurface formations.

In the example illustrated in FIG. 1, seismic operation 100 may include use of truck 101 having seismic energy source 103, such as a heave plate. Although shown as a land-based, seismic operation 100 may also be marine-based. When seismic energy source 103 is actuated, seismic energy source 103 may create seismic wave 105 that propagates through the earth towards one or more subsurface formations 118.

Seismic wave 105 may reflect from subsurface features 107, such as underground rock structures, forming reflected seismic waves 109, which may be received and converted to seismic data by receiver array 113. Receiver array 113 may include one or more receivers 111. Receivers 111 may include, but are not limited to, geophones or hydrophones. Receiver array 113 may be positioned on the earth's surface, subsurface, the ocean floor, or may be towed along the surface of a body of water, or in a well. Receiver array 113 may be adapted to detect seismic energy and may be placed to receive reflected seismic waves 109.

Receiver array 113 may be in communication with seismic data processor 115. In some embodiments, receiver array 113 may communicate seismic data to seismic data processor 115 for storage, analysis, and processing.

Seismic data processor 115 may include a CPU or GPU with a data storage device having a non-transitory computer readable medium, memory, a processor, a communications bus, a visual display, and user input device that captures seismic data for storage and further processing. In some embodiments, seismic data processor 115 is a network of CPUs or GPUs. In certain embodiments, seismic data processor 115 is a computing cluster.

In some embodiments, seismic data processor 115 includes a non-transitory computer readable medium containing executable program instructions executed by seismic data processor 115 that, when executed, may access seismic data stored on the data storage device of the computer and process and analyze the seismic data. In certain embodiments, seismic data processor 115 may include memory-efficient Q-RTM module 117, described herein below.

Figure 2:
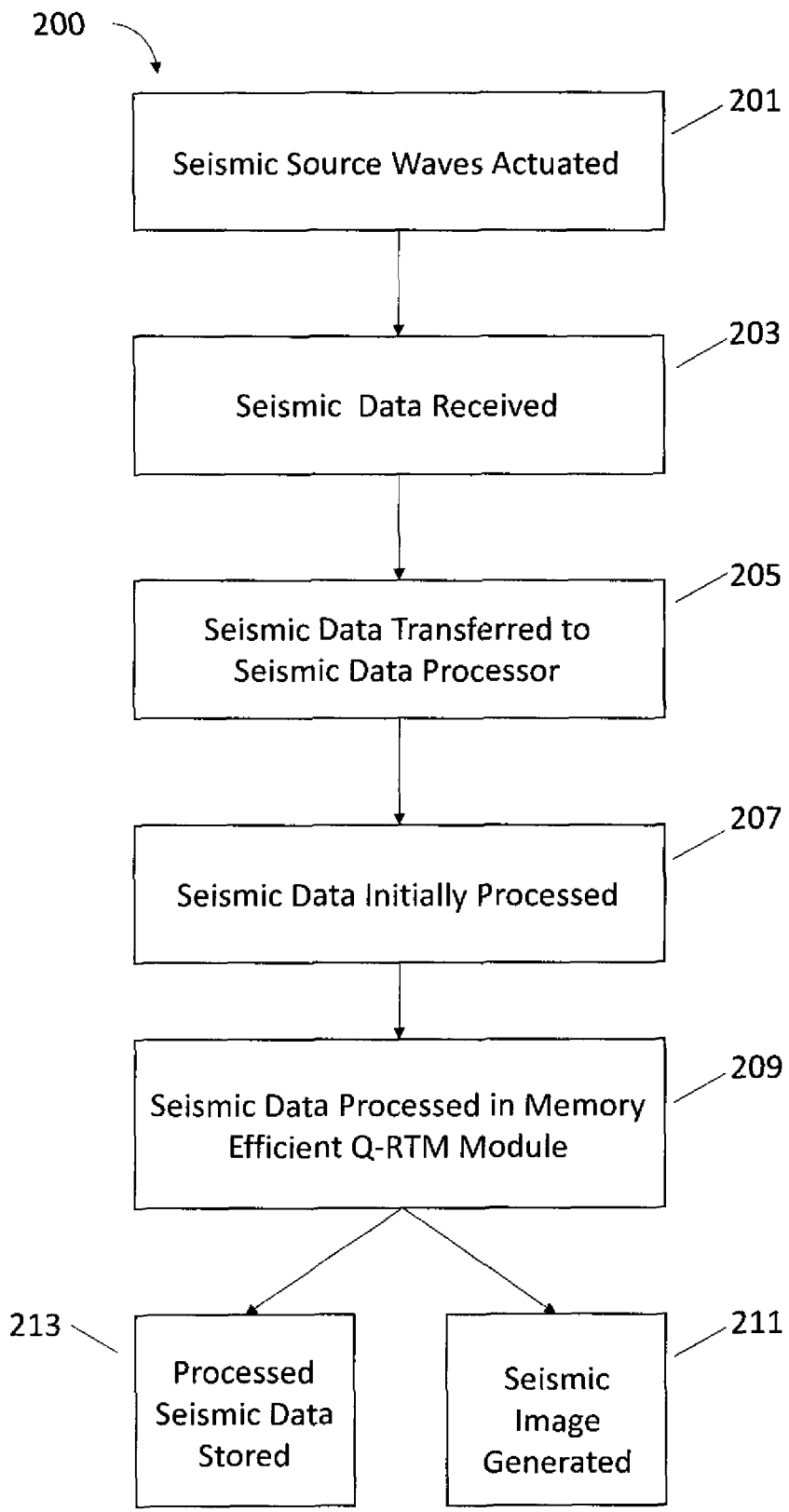
FIG. 2 is a flow chart of a method for imaging seismic data consistent with certain embodiments of the present disclosure.

FIG. 2 depicts seismic image data process 200 performed by seismic data processor 15 in accordance with some embodiments using memory-efficient Q-RTM module 117 to image seismic data.

Seismic energy source 103 may actuate forming seismic wave 105 directed towards the earth's surface (201). In some embodiments, seismic energy source 103 is land-based and in some embodiments, seismic energy source 103 may be marine-based.

Receiver array 113 disposed in a survey region may receive reflected seismic waves 109 and convert reflected seismic waves 109 to seismic data (203). In certain embodiments, the reflected seismic waves may be attenuated.

The seismic data may be transferred to seismic data processor 115 having memory-efficient Q-RTM module 117 adapted to process and store seismic data (205). In some embodiments, receiver array 113 may be directly connected to seismic data processor 115 and transmit data in real time. In other embodiments, receiver array 113 may have a local memory for storing seismic data and may transmit data periodically. In some embodiments, receivers 111 may be connected to an external data storage device for transmitting the seismic data to the external storage device prior to transmitting to seismic data processor 115.

The seismic data may be preprocessed (207), such as by applying preprocessing methods including denoising, deconvolution data regularization, demultiple, automatic gain control techniques, and data filtering processes. In some embodiments, the preprocessing method may reveal areas of attenuated seismic data requiring further processing. In some embodiments, the frequency range of the attenuated seismic data may be analyzed. The seismic data may be processed with the memory-efficient Q-RTM module 117 to form processed seismic data (209). In some embodiments, the processed seismic data may be stored on a data storage device (213) and/or used to generate a seismic image (211).

In some embodiments, the processing of seismic data by memory-efficient Q-RTM module 117 may produce a seismic image on the visual display of the seismic data processor 115. The seismic data may be processed for imaging purposes, using a variety of techniques to create seismic images, including cross sections and 3-D graphics, of the subsurface of a surveyed region. The techniques to seismic images of the subsurface of a surveyed region may include denoising, deconvolution, demultiple, and velocity model building. The seismic data and seismic images may be further analyzed to infer the structure and composition of the earth's subsurface including the presence of hydrocarbons in subsurface formations. The seismic image may include a stacked image, an image of a subsurface formation, a 3-D image, or any other known manifestation of processed seismic data. The seismic image may be stored on the data storage device, may be transmitted to another computer or server via the communications bus, or may be printed. The seismic image may be further analyzed to determine the potential presence of hydrocarbons in a subsurface formation.

Memory-Efficient Q-RTM Module

As used herein, "memory-efficient Q-RTM module" 117 is control logic, a computer executable program, or software that is configured to receive attenuated seismic data, a velocity model, and a Q model (collectively, "inputs"), process the inputs, and generate a seismic image. In some embodiments, memory-efficient Q-RTM module 117 may be a stand-alone computing device. In some embodiments, memory-efficient Q-RTM module 117 may be used to process seismic data using only GPUs.

Figure 3:
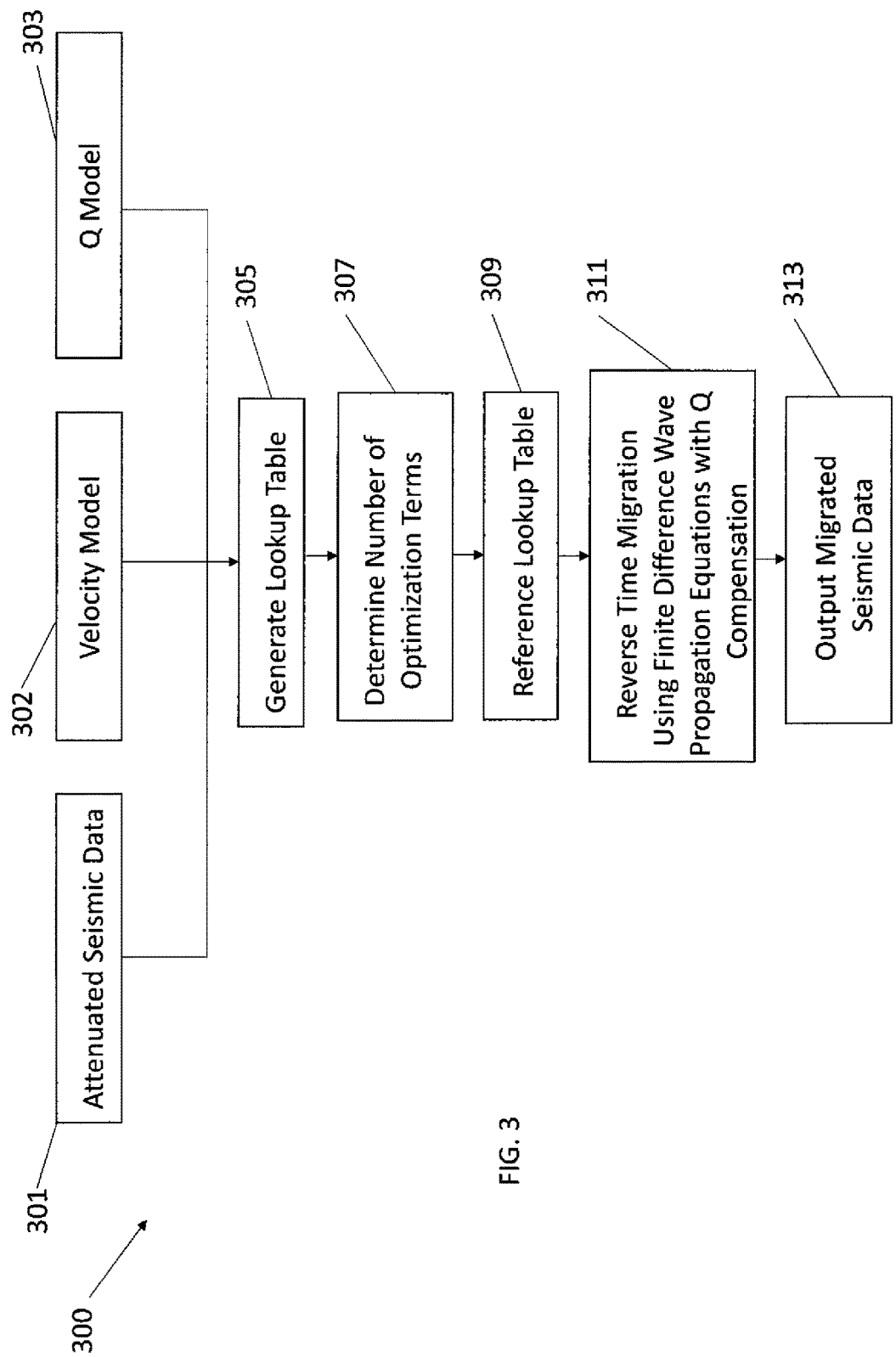
FIG. 3 is a flow chart of a memory-efficient Q-RTM module consistent with embodiments of the present disclosure.

FIG. 3 depicts detailed implementation of step 209 (implementation 300) wherein attenuated seismic data received from receiver array 113 is processed in seismic data processor 115 by memory-efficient Q-RTM module 117. As shown in FIG. 3, the inputs to the Q-RTM are: 1) attenuated seismic data (301); 2) velocity model (302); and 3) Q model (303).

A subsurface seismic velocity model (302) may be used in the multi-stage dispersion optimization algorithm for phase correction. Non-limiting examples of subsurface seismic velocity models may be found in Seismic Velocity Model Building: An Aid for Better Understanding of Subsurface, Ajeet Kr. Pandey et al. 10th Biennial International Conference and Exposition (2013).

Q model may be created using a grid-based Q tomography method. In at least one embodiment, the subsurface Q model is gridded to construct the unknown vector x and each element in the vector x is the Q value of the corresponding grid to be solved. The seismic data may be input into a migration engine to produce the prestack depth migration common image gathers. Thereafter, strong events in the migration common image gathers are picked for attribute analysis (such as amplitude, frequency content, etc.). The method may include shooting seismic rays (using a ray tracing numerical simulation tool) from the picked events upward to obtain the raypath information to construct kernel matrix A. The attributes of the picked events are compared with the reference attributes (the reference attributes are obtained by analyzing the events with no Q effect involved) to find the attribute difference to construct the measurement vector b. The equation Ax=b is solved for the unknown subsurface Q values contained in x.

In some embodiments, in generate lookup table 305, memory-efficient Q-RTM module 117 may build a lookup table of dispersion optimization parameters as a function of Q values.

Conventional RTM modules without Q compensation may use a finite difference algorithm. However, conventional RTM modules with Q compensation have been unable to use the finite difference algorithm because the wave propagation equation includes a fractional derivative. The multi-stage dispersion optimized negative-τ method allows use of the finite-difference method in Q-RTM modules. The multi-stage dispersion optimized negative-τ method creates the ability to use a finite difference algorithm for Q-RTM with the compensation of amplitude attenuation and phase velocity change.

In the memory-efficient Q-RTM module, the "finite difference algorithms for Q-RTM" may perform a wave propagation equation with Q compensation for RTM having one or more dispersion optimization terms, dependent on Q, using a finite difference algorithm.

In the memory-efficient Q-RTM module, the dispersion optimization terms are implemented using finite difference operators. The dispersion optimization parameters may be obtained through a polynomial fitting algorithm. In some embodiments, the memory-efficient Q-RTM module uses a polynomial approximation to obtain the optimal values of the dispersion optimization parameters ($\alpha$, $\beta$, $\gamma$), as used herein below, to modify phase velocity to match a reference phase velocity. The dispersion optimization parameters may be known. In some embodiments, the dispersion optimization parameters correct the phase velocity change. In some embodiments, the memory-efficient Q-RTM module corrects the dispersion relation of the negative-τ method for amplitude compensation, which replaces the effects of attenuation with a compensation effect, by introducing dispersion optimization terms into the wave equation with Q compensation so that the dispersion relation of the negative-τ method for amplitude compensation is adjusted to approximate the dispersion relation of the τ method for Q attenuation.

In some embodiments, the lookup table is built where for each value of Q, polynomial approximation is used to calculate the dispersion optimization parameters that will allow a generated dispersion relation curve to match a reference dispersion relation curve.

As used herein, a "multi-stage dispersion optimization algorithm for phase velocity correction" means a set of logical instructions for compensation for phase velocity change in the negative-τ method for Q-RTM. In some embodiments, the multi-stage dispersion optimization algorithm for phase velocity correction may include a set of logical instructions for application of one or more dispersion optimization terms to the wave propagation equations solved by the finite difference algorithms for Q-RTM. In some embodiments, the one or more dispersion optimization terms are dependent on Q. In some embodiments, the multi-stage dispersion optimization algorithm for phase velocity correction may also compensate amplitude attenuation. In some embodiments, the wave propagation equations may be acoustic wave equations designed to compensate Q. In some embodiments, the wave propagation equations do not have a fractional derivative allowing for the wave equations to be solved through the finite difference algorithms for Q-RTM. With this multi-stage dispersion optimization algorithm for phase velocity correction, the dispersion relation of the negative-τ method, which is designed for the Q compensation procedure, is adjusted to approximate the dispersion relation of the Q attenuation procedure. In some embodiments, the multi-stage dispersion optimization algorithm for phase velocity correction may also compensate for amplitude attenuation. The one or more dispersion optimization terms may be any combination of variables, integers, and parameters connected by mathematical operators including, for example, dispersion optimization parameters. Dispersion optimization parameters may be representations of predetermined numbers used for making a generated dispersion relation curve match a pre-defined reference dispersion relation curve. Matching the generated dispersion relation curve with the pre-defined dispersion relation curve may be accomplished by a mathematic error measurement function or by a sight comparison. In certain embodiments, the generated dispersion relation curve is generated prior to implementation of Q-RTM, as described below. In some embodiments, the one or more dispersion optimization parameters are dependent on Q.

Memory-efficient Q-RTM module 117 may determine the number of the dispersion optimization terms to be introduced into the wave propagation equations (307). In some embodiments, the number of the dispersion optimization terms to be introduced into the wave equations may depend on the frequency range of the seismic data. In some embodiments, the number of the dispersion optimization terms to be introduced to the wave equations may depend on an error tolerance. In such an embodiment, the error tolerance represents a mismatch between the generated dispersion relation curve and the reference dispersion relation curve.

In certain embodiments, two optimization terms may be used. In other embodiments, three optimization terms may be used. In certain embodiments, dispersion optimization parameters may include $\alpha$, $\beta$, and $\gamma$ for dispersion optimization terms $$\alpha p, \beta \frac{\lambda}{\rho} \nabla^2 p, \text{ and } \gamma \frac{\lambda}{\rho} \nabla^2 \left( \frac{\lambda}{\rho} \nabla^2 p \right).$$

In reference lookup table step 309, parameters $\alpha$ and $\beta$ (for two-term optimization systems), parameters $\alpha$ and $\beta$ and $\gamma$ for three term optimization systems may be determined. In certain embodiments, the parameters may be determined by recursion. Compensation of dispersion relation becomes more accurate with additional dispersion optimization terms. However, each additional dispersion optimization term may require higher computational requirements.

Following determination of the parameters, step 209 may include reverse time migration using finite different wave propagation with Q compensation (step 311). To compensate for attenuation, the amplitude attenuation and phase change may be compensated during propagation by reversing τ, attaining a negative-Q. To compensate the phase dispersion, the phase velocity may be kept the same as the attenuation process while amplitude attenuation is compensated in the memory-efficient Q-RTM module. In some embodiments, memory-efficient Q-RTM module 117 derives a negative-Q using the negative-τ method. Negative-τ may approximate a constant Q over a specific frequency range.

As used herein, the "negative-τ method for amplitude compensation" means a set of logical instructions for compensation of amplitude attenuation by application of a negative parameter for approximating a constant Q over a frequency range, i.e., negative-τ. In some embodiments, the negative-τ method for amplitude compensation replaces the effects of attenuation with a compensation effect, negative Q. In some embodiments, the negative-τ method for amplitude compensation inhibits fractional derivatives in wave propagation equations such that a finite-difference algorithm for Q-RTM may be used to solve the wave propagation equations.

The attenuated seismic data may be compensated for attenuation using the following equations using a negative-τ method and multi-stage dispersion optimization terms:

$$c_p(\omega)' \approx c\sqrt{1 - L\tau + \sum_{l=1}^{L} \frac{\tau}{1+\omega^2 \tau_{\sigma l}^2} + \alpha - \beta\omega^2 + \gamma\omega^4}$$

$$Q(\omega)' = -\frac{1 - L\tau + \sum_{l=1}^{L} \frac{\tau}{1+\omega^2 \tau_{\sigma l}^2} + \alpha - \beta\omega^2 + \gamma\omega^4}{\sum_{l=1}^{L} \frac{\omega\tau\tau_{\sigma l}}{1+\omega^2 \tau_{\sigma l}^2}}$$

Where $c_p(\omega)'$ represents phase velocity and $Q(\omega)'$ compensated Q at a specific frequency range. The above equation may allow compensation of amplitude attenuation without incurring instability to the system of equations.

The distribution of $\tau_{\sigma l}$ may be determined empirically. $\tau_{\sigma l}$ may be distributed logarithmically over a predetermined frequency range; such a strategy generally yields a nearly constant Q value over the frequency range of the seismic data. For example, $\tau_{\sigma l} = 1/(2\pi f_l)$, where $f_1 = 0.6$ Hz, $f_2 = 3$ Hz, $f_3 = 15$ Hz, $f_4 = 75$ Hz, $f_5 = 375$ Hz.

The parameter τ may be determined by minimizing the following cost function $$J = \int_{\omega_a}^{\omega_b} [Q^{-1}(\omega, \tau_{\sigma l}, \tau) - Q_0^{-1}]^2 d\omega$$

where $\omega_a$ and $\omega_b$ are the lower and upper bounds of the frequency range, and $Q_0$ is the specified Q value, which may be constant over the predetermined frequency range to simulate. τ can be calculated by using $$\tau = \frac{1}{Q_0} \frac{\sum_{l=1}^{L} I_{0l}}{\sum_{l=1}^{L} I_{1l} + 2\sum_{l=1}^{L-1} \sum_{k=l+1}^{L} I_{2kl}}$$

where $$I_{0l} = \frac{1}{2\tau_{\sigma l}} [\log(1 + \omega^2 \tau_{\sigma l}^2)]_{\omega_a}^{\omega_b}$$

$$I_{1l} = \frac{1}{2\tau_{\sigma l}} \left[\arctan(\omega\tau_{\sigma l}) - \frac{\omega\tau_{\sigma l}}{1+\omega^2 \tau_{\sigma l}^2}\right]_{\omega_a}^{\omega_b}$$

$$I_{2lk} = \frac{\tau_{\sigma l}\tau_{\sigma k}}{\tau_{\sigma k}^2 - \tau_{\sigma l}^2} \left[\frac{\arctan(\omega\tau_{\sigma l})}{\tau_{\sigma l}} - \frac{\arctan(\omega\tau_{\sigma k})}{\tau_{\sigma k}}\right]_{\omega_a}^{\omega_b}$$

In some embodiments, memory-efficient Q-RTM module 117 may perform RTM by solving wave propagation equations using a finite difference algorithm (311). In some embodiments, memory-efficient Q-RTM module 117 may introduce the dispersion optimization terms to the wave equation compensating for the phase velocity during backwards propagation.

In some embodiments, the wave equation with Q compensation used by the memory-efficient Q-RTM module is:

$$\frac{\partial^2 p}{\partial t^2} = \frac{\lambda}{\rho}(1 - L\tau)\nabla^2(p + p^c) - \sum_{i=1}^{L} s_i + \frac{\partial Q}{\partial t}$$

$$\frac{\partial s_i}{\partial t} = -\frac{1}{\tau_{\sigma i}} s_i - \frac{\lambda\tau}{\rho\tau_{\sigma i}} \nabla^2 p$$

where $$p^c \approx \alpha p + \beta \frac{\lambda}{\rho} \nabla^2 p + \gamma \frac{\lambda}{\rho} \nabla^2 \left(\frac{\lambda}{\rho} \nabla^2 p\right)$$

$p^c$ may include dispersion optimization terms added to the wave propagation equation and dependent on dispersion optimization parameters α, β, and γ for dispersion optimization terms $$\alpha p, \beta \frac{\lambda}{\rho} \nabla^2 p, \text{ and } \gamma \frac{\lambda}{\rho} \nabla^2 \left(\frac{\lambda}{\rho} \nabla^2 p\right).$$

In some embodiments, memory-efficient Q-RTM module 117 may output migrated seismic data (313).

Other Embodiments

Compared with conventional computer methods, memory-efficient Q-RTM module 117 more efficiently uses computational resources because the effect of fractional time derivative terms or fractional spatial derivative terms is approximated by memory variable summation, i.e. the fractional derivative effect can be simulated approximately by the introduction of the memory variables, which can be realized by a finite-difference method.

Compared with conventional computer methods, the multi-stage dispersion relation optimization algorithm for phase velocity correction and the memory-efficient Q-RTM module make more efficient use of computational resources because the multi-stage dispersion relation optimization algorithm for phase velocity correction and the memory-efficient Q-RTM module are implemented by a finite-difference algorithm, which is a local differential-operator-based approach. In the local differential-operator-based approach, the calculation of a back-propagated seismic wavefield at each subsurface point only requires wavefield information at several neighboring points. By using local differential operators such as the finite difference operator, the calculation of the back-propagated seismic wavefield at each subsurface point uses wavefield information at several neighboring points, a local computational domain. In comparison, the global approach requires wavefield information for the global computational domain. By using wavefield information for the several neighboring points in the parallel processing of the finite difference algorithms, CPU and GPU memory limitations are less utilized compared to the global computational domain approach (as used by the pseudo-spectral method) and increased communications between the CPUs and GPUs for computational domain decomposition is not necessary.

FIGS. 4A-4C depict simulated data based on a Ricker wavelet. FIG. 4A depicts a Ricker source wavelet excited at a source location. FIG. 4B depicts attenuated seismic data detected by receiver array 113 disposed at a distance from the source location where the wavelet of the received attenuated seismic data exhibits amplitude attenuation and wavelet distortion caused by the phase change. FIG. 4C depicts two signals. The first signal is a back-propagated time-reversed attenuated seismic data recorded at the seismic source location with Q-compensation by application of the negative-$\tau$ method (i.e., without phase velocity correction), observed as an amplitude compensated signal with further wavelet distortion. The second signal is the back-propagated time-reversed attenuated seismic data recorded at the seismic source location with Q-compensation by application of the multi-stage dispersion optimization algorithm for phase velocity correction to the wave equations compensating for the amplitude during backwards propagation, observed as a signal with both amplitude and phase compensated. The Ricker source wavelet of FIG. 4A and the wavelet resulting from the application of the multi-stage dispersion optimized negative $\tau$-method on attenuated seismic data during backwards propagation are similar.

Figure 5A:
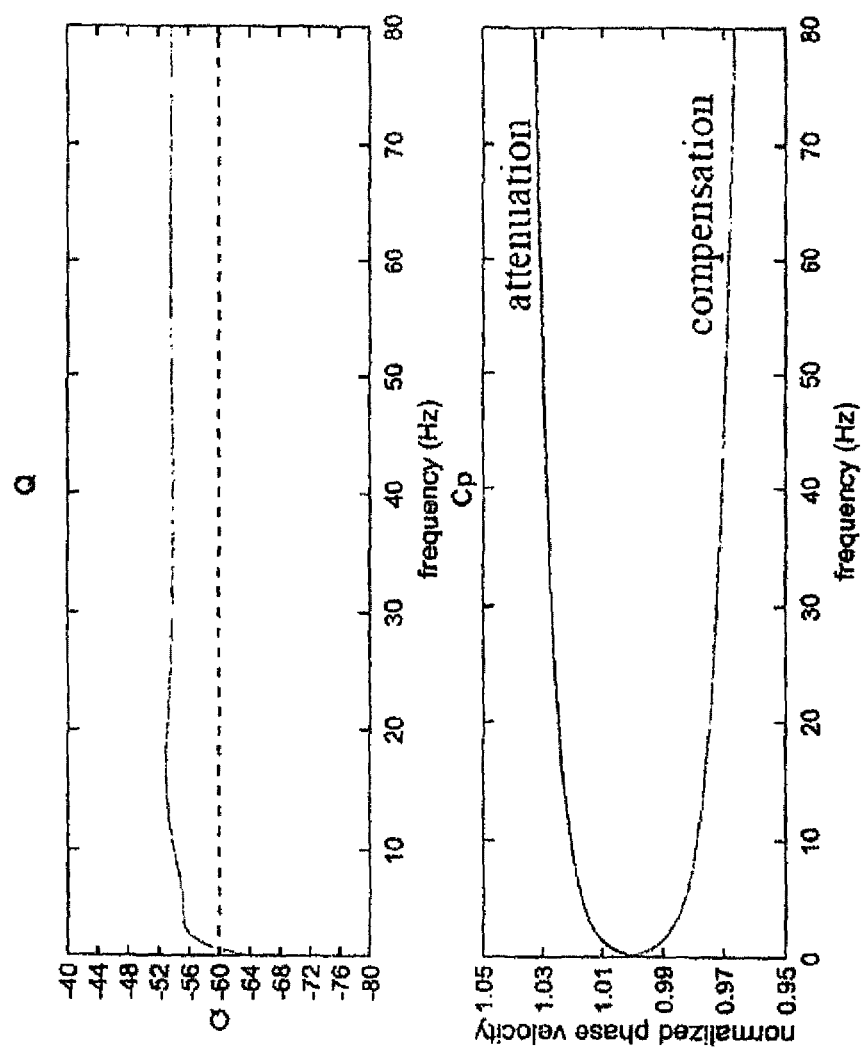
FIGS. 5A-5D depict the dispersion relation and Q of simulated seismic data.
Figure 5B:
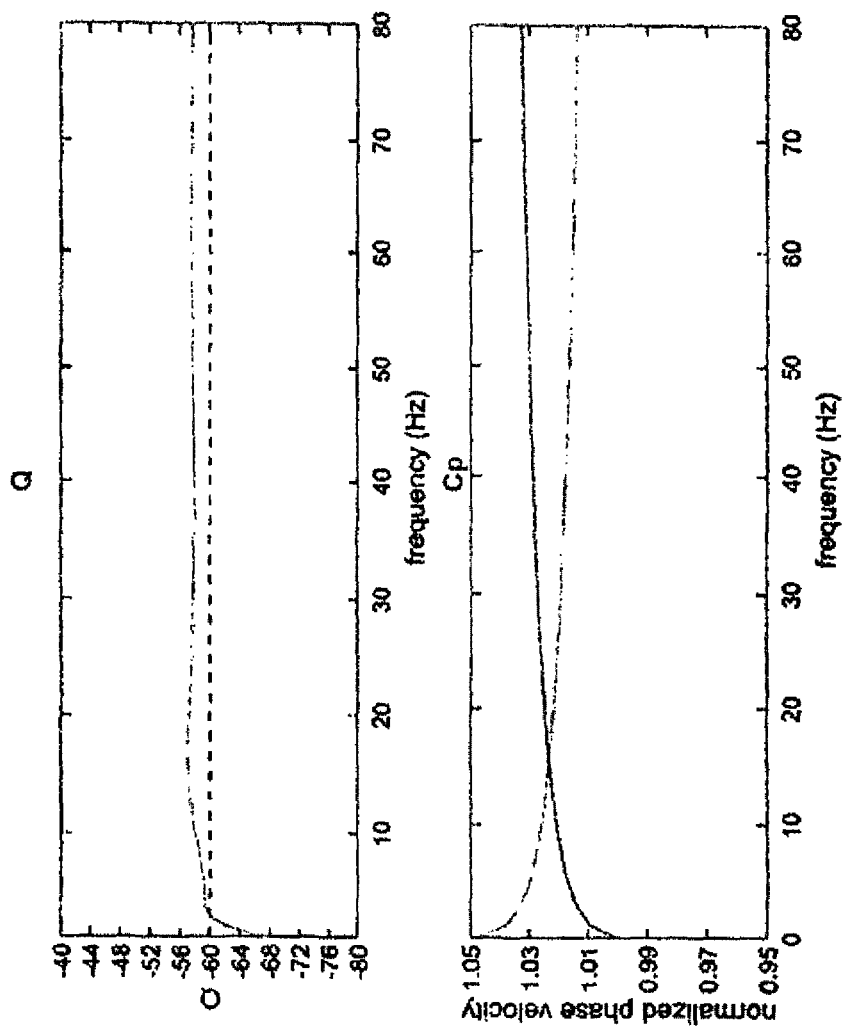
Figure 5C:
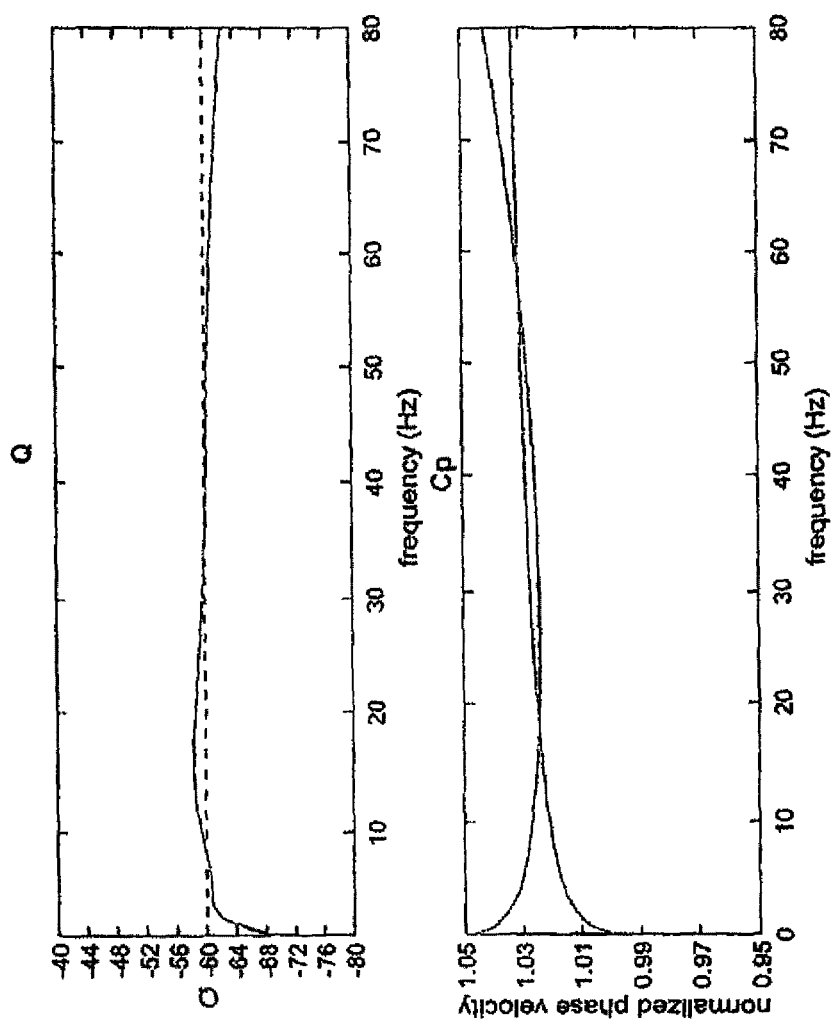
Figure 5D:
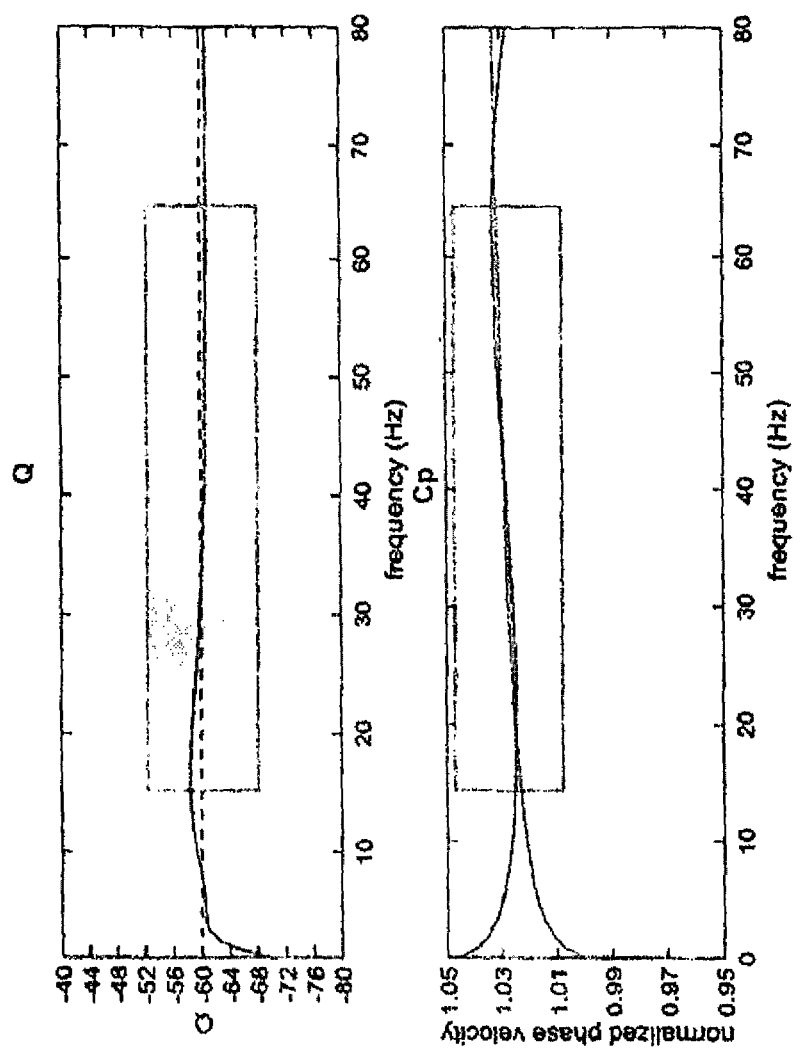

FIGS. 5A-5D depict the dispersion relation, or phase velocity, and Q as a function of frequency, as each dispersion optimization term is applied to the wave equations for seismic data from a medium where the constant Q-value is approximately −60 and $\tau$ is 0.0188. FIG. 5A depicts a curve of phase velocity over frequency of conventional wave propagation algorithms with attenuation, a curve of phase velocity over frequency of the negative-$\tau$ method without the multi-stage dispersion optimization algorithm for phase correction, and Q-values of the negative-$\tau$ method without the multi-stage dispersion optimization algorithm for phase correction showing phase velocity deviation from the Q attenuation case, and inaccurate Q of the seismic data. FIG. 5B depicts phase velocity and Q over frequency of the negative-$\tau$ method compensated by the application of a first-stage dispersion optimization term, the first-stage Q compensation case. After the first dispersion optimization term is applied to the wave equations, the Q-values adjust closer to −60 and the dispersion relation discrepancy, the difference between the dispersion relation curve from the attenuation case and the dispersion relation curve from first-stage Q compensation case, is significantly reduced. FIG. 5C depicts Q and phase velocity further compensated by the application of a second-stage dispersion optimization term, in addition to the first dispersion optimization term, to the wave equations showing further compensation of Q and phase velocity, a second-stage Q compensation case. FIG. 5D depicts a dispersion relation curve and Q after a third-stage dispersion optimization term, in addition to the first and second-dispersion optimization terms, is applied to the wave equations showing still further compensation of Q and phase velocity. With the application of additional dispersion optimization terms, Q and the phase velocity undergo compensation such that Q over a frequency range is nearly −60 and the compensated phase velocity from the application of three dispersion optimization terms to the wave equations nearly matches the phase velocity of the conventional wave propagation algorithms with attenuation.

Figure 6A:
FIG. 6A depicts a seismic image generated using a conventional RTM computer method for imaging attenuated seismic data.
Figure 6B:
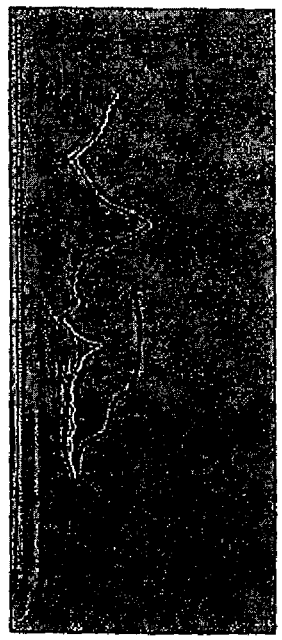
FIG. 6B depicts a seismic image generated using a memory-efficient Q-RTM module on attenuated seismic data consistent with embodiments of the present disclosure.
Figure 6C:
FIG. 6C is a reference seismic image generated using a conventional RTM computer method for imaging non-attenuated seismic data.

FIGS. 6A-6C show (1) migrated seismic image FIG. 6A generated by applying a conventional RTM computer method for imaging attenuated seismic data, (2) migrated image FIG. 6B generated by applying memory-efficient Q-RTM module 117 for imaging attenuated seismic data, and (3) the reference seismic image. FIG. 6C is generated by a conventional RTM without Q compensation for unattenuated seismic data. As shown in FIGS. 6A-6C, memory-efficient Q-RTM module 117 compensates Q and phase velocity better than the conventional RTM computer method by resulting in a seismic image that more closely resembles reference unattenuated seismic image, FIG. 6C. FIGS. 6A-6C are based on seismic data from the Sigsbee 2A model. Specifically, FIG. 6A depicts areas of low resolution where the structure of the underlying survey region cannot be determined whereas FIG. 6B depicts a seismic image that is nearly identical to the reference seismic image FIG. 6C showing recovery of resolution and structural details of the survey region.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art may readily use the present disclosure as a basis for designing or modifying other processes and structures for carrying out the same purposes and/or achieving the same advantages of the embodiments introduced herein. One of ordinary skill in the art may make various changes, substitutions, and alterations without departing from the spirit and scope of the present disclosure.

The invention claimed is:

1. An improved method in computer-related technology, the method comprising:
    receiving attenuated seismic data;
    receiving a velocity model;
    receiving a Q model;
    processing the attenuated seismic data, the velocity model, and the Q model using an memory-efficient Q-RTM module, the memory-efficient Q-RTM module comprising a computer-executable program stored on a non-tangible medium and performing RTM using a finite difference algorithm to solve:

$$\frac{\partial^2 p}{\partial t^2} = \frac{\lambda}{\rho}(1 - L\tau)\nabla^2 (p + p^c) - \sum_{i=1}^{L} s_i + \frac{\partial Q}{\partial t}$$

$$\frac{\partial s_i}{\partial t} = -\frac{1}{\tau_{\sigma i}} s_i - \frac{\lambda \tau}{\rho \tau_{\sigma i}} \nabla^2 p$$

where t is time, $\tau$ and $\tau_\sigma$ are parameters introduced to approximate a constant Q effect over a specific frequency range, L is the number of relaxation mechanisms, and $p^c$ is a sum of one or more dispersion optimization terms; and
    generating a seismic image.

2. The method of claim 1, wherein $p^c$ comprises two dispersion optimization terms defined as:

$$p^c \approx \alpha p + \beta \frac{\lambda}{\rho} \nabla^2 p$$

where p is pressure and $\alpha$ and $\beta$ are dispersion optimization parameters.

3. The method of claim 1, wherein $p^c$ comprises three dispersion optimization terms defined as:

$$p^c \approx \alpha p + \beta \frac{\lambda}{\rho} \nabla^2 p + \gamma \frac{\lambda}{\rho} \nabla^2 \left( \frac{\lambda}{\rho} \nabla^2 p \right)$$

where p is pressure and $\alpha$, $\beta$, and $\gamma$ are dispersion optimization parameters.

4. The method of claim 1, wherein the dispersion parameters are calculated by generating a lookup table, determining the number of dispersion optimization terms, and referencing the lookup table.

5. The method of claim 4, wherein the negative-$\tau$ method combined with multi-stage dispersion optimization for amplitude compensation comprises use of the following equations:

$$c_p(\omega)' \approx c \sqrt{1 - L\tau + \sum_{l=1}^{L} \frac{\tau}{1 + \omega^2 \tau_{\sigma l}^2} + \alpha - \beta \omega^2 + \gamma \omega^4}$$

$$Q(\omega)' = -\frac{1 - L\tau + \sum_{l=1}^{L} \frac{\tau}{1 + \omega^2 \tau_{\sigma l}^2} + \alpha - \beta \omega^2 + \gamma \omega^4}{\sum_{l=1}^{L} \frac{\omega \tau \tau_{\sigma l}}{1 + \omega^2 \tau_{\sigma l}^2}}$$

where $c_p(\omega)'$ represents phase velocity and $Q(\omega)'$ compensated Q at a specific frequency range.

6. The method of claim 5, wherein $\tau_{\sigma l}$ is determined empirically.

7. The method of claim 5, wherein $\tau$ is determining by minimizing the following cost function $$\int_{\omega_a}^{\omega_b} [Q^{-1}(\omega, \tau_{\sigma l}, \tau) - Q_0^{-1}]^2 d\omega$$

where $\omega_a$ and $\omega_b$ are the lower and upper bounds of the frequency range, and $Q_0$ is a specified Q value.

8. A method for imaging seismic data comprising:
creating a seismic wave;
reflecting the seismic wave from a subsurface feature to form a reflected seismic wave;
receiving the reflected seismic wave with one or more receivers;
converting the reflected seismic wave to attenuated seismic data;
communicating the attenuated seismic data to a seismic data processor, the seismic data processor including a memory efficient Q-RTM module;
receiving a velocity model;
receiving a Q model;
processing the attenuated seismic data, the velocity model, and the Q model using a memory-efficient Q-RTM module, the memory-efficient Q-RTM module comprising a computer-executable program stored on a non-tangible medium and performing RTM using a finite difference algorithm to solve:

$$\frac{\partial^2 p}{\partial t^2} = \frac{\lambda}{\rho}(1 - L\tau)\nabla^2 (p + p^c) - \sum_{i=1}^{L} s_i + \frac{\partial Q}{\partial t}$$

-continued $$\frac{\partial s_i}{\partial t} = -\frac{1}{\tau_{\sigma i}} s_i - \frac{\lambda \tau}{\rho \tau_{\sigma i}} \nabla^2 p$$

where t is time, $\tau$ and $\tau_\sigma$ are parameters introduced to approximate a constant Q effect over a specific frequency range, and $p^c$ is a sum of one or more dispersion optimization terms; and
generating a seismic image.

9. The method of claim 8, wherein the seismic data processor comprises one or more CPUs or GPUs.

10. The method of claim 8, wherein $p^c$ comprises two dispersion optimization terms defined as:

$$p^c \approx \alpha p + \beta \frac{\lambda}{\rho} \nabla^2 p$$

where p is pressure and $\alpha$ and $\beta$ are dispersion optimization parameters.

11. The method of claim 8, wherein $p^c$ comprises three dispersion optimization terms defined as:

$$p^c \approx \alpha p + \beta \frac{\lambda}{\rho} \nabla^2 p + \gamma \frac{\lambda}{\rho} \nabla^2 \left( \frac{\lambda}{\rho} \nabla^2 p \right)$$

where p is pressure and $\alpha$, $\beta$, and $\gamma$ are dispersion optimization parameters.

12. The method of claim 8, wherein the dispersion parameters are calculated by generating a lookup table, determining the number of dispersion optimization terms, and referencing the lookup table.

13. The method of claim 8, further comprising using a negative-$\tau$ method for amplitude compensation.

14. The method of claim 13, wherein the negative-$\tau$ method combined with multi-stage dispersion optimization for amplitude compensation comprises use of the following equations:

$$c_p(\omega)' \approx c \sqrt{1 - L\tau + \sum_{l=1}^{L} \frac{\tau}{1 + \omega^2 \tau_{\sigma l}^2} + \alpha - \beta \omega^2 + \gamma \omega^4}$$

$$Q(\omega)' = -\frac{1 - L\tau + \sum_{l=1}^{L} \frac{\tau}{1 + \omega^2 \tau_{\sigma l}^2} + \alpha - \beta \omega^2 + \gamma \omega^4}{\sum_{l=1}^{L} \frac{\omega \tau \tau_{\sigma l}}{1 + \omega^2 \tau_{\sigma l}^2}}$$

where $c_p(\omega)'$ represents phase velocity and $Q(\omega)'$ compensated Q at a specific frequency range.

15. The method of claim 8, wherein the dispersion optimization terms are evaluated using finite difference operations and not using global differential operators.

16. The method of claim 15, wherein the evaluation of dispersion optimization terms using finite difference operators uses computational resources than using global differential operators.

* * * * *